(12) United States Patent
Babcock

(10) Patent No.: US 7,281,222 B1
(45) Date of Patent: Oct. 9, 2007

(54) SYSTEM AND METHOD FOR AUTOMATIC GENERATION OF OPTICAL PROXIMITY CORRECTION (OPC) RULE SETS

(75) Inventor: Carl P. Babcock, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 199 days.

(21) Appl. No.: 10/859,278

(22) Filed: Jun. 2, 2004

(51) Int. Cl.
*G06F 17/50* (2006.01)

(52) U.S. Cl. .............. 716/4; 716/5; 716/19; 716/21
(58) Field of Classification Search ............ 716/4, 716/19, 21, 11, 5
See application file for complete search history.

(56) References Cited

U.S. PATENT DOCUMENTS

| | | | | |
|---|---|---|---|---|
| 5,987,240 | A * | 11/1999 | Kay | 716/5 |
| 6,063,132 | A * | 5/2000 | DeCamp et al. | 716/5 |
| 6,370,679 | B1 * | 4/2002 | Chang et al. | 716/19 |
| 6,523,162 | B1 * | 2/2003 | Agrawal et al. | 716/19 |
| 6,775,817 | B2 * | 8/2004 | Ono et al. | 716/21 |
| 7,001,693 | B2 * | 2/2006 | Liebmann et al. | 430/5 |
| 7,147,976 | B2 * | 12/2006 | Liebmann et al. | 430/5 |
| 2002/0100005 | A1 * | 7/2002 | Anderson et al. | 716/5 |
| 2002/0102055 | A1 * | 8/2002 | Zweiback et al. | 385/37 |
| 2002/0116697 | A1 * | 8/2002 | Okamoto et al. | 716/21 |
| 2003/0115569 | A1 * | 6/2003 | Ikeuchi | 716/19 |
| 2004/0139418 | A1 * | 7/2004 | Shi et al. | 716/19 |
| 2004/0170905 | A1 * | 9/2004 | Liebmann et al. | 430/5 |
| 2004/0268290 | A1 * | 12/2004 | Allen et al. | 716/21 |
| 2005/0022150 | A1 * | 1/2005 | Liu et al. | 716/19 |
| 2005/0278685 | A1 * | 12/2005 | Granik et al. | 716/19 |
| 2005/0289500 | A1 * | 12/2005 | Misaka et al. | 716/19 |
| 2006/0053400 | A1 * | 3/2006 | Meyer et al. | 716/11 |
| 2006/0245636 | A1 * | 11/2006 | Kitamura et al. | 382/149 |

* cited by examiner

*Primary Examiner*—Paul Dinh
*Assistant Examiner*—Suchin Parihar
(74) *Attorney, Agent, or Firm*—Winstead PC

(57) ABSTRACT

A method of automatically creating and/or optimizing an optical proximity correction (OPC) rule set can include providing an initial OPC rule set and applying the initial OPC rule set to a layout data set to generate a corrected layout data set. The corrected data set can be simulated and optical rule checking (ORC) can be performed. Based on the simulation and ORC, it can be determined whether residual edge placement errors are present within the corrected layout data set and whether the residual errors lie outside specified limits. If residual edge placement errors are present within the corrected layout data set or lie outside of specified limits, existing OPC rules can be modified and/or new OPC rules can be added to the initial OPC rule set to correct the residual edge placement errors.

16 Claims, 3 Drawing Sheets

SYSTEM AND METHOD FOR AUTOMATIC GENERATION OF OPTICAL PROXIMITY CORRECTION (OPC) RULE SETS

TECHNICAL FIELD

The present invention relates generally to the field of integrated circuit device design and manufacture and, more particularly, to a method of automatically creating and/or optimizing optical proximity correction (OPC) rules for correcting a photolithographic pattern layout.

BACKGROUND

Optical lithography or photolithography has been widely used in the semiconductor industry in connection with the formation of a wide range of structures present in integrated circuit (IC) devices. The photolithography process generally begins with the formation of a photoresist layer on or over the top surface of a semiconductor substrate or wafer (or some intermediate layer). A reticle or mask having fully light non-transmissive opaque regions, which are often formed of chrome, and fully light transmissive clear regions, which are often formed of quartz, is positioned over the photoresist-coated wafer.

The mask is placed between a radiation or light source, which produces light of a pre-selected wavelength (e.g., ultraviolet light) and geometry, and an optical lens system, which may form part of a stepper or scanner apparatus. When light from the light source is directed onto the mask, the light is focused to generate a reduced mask image on the wafer, typically using the optical lens system, which contains one or several lenses, filters, and/or mirrors. The light passes through the clear regions of the mask to expose the underlying photoresist layer and is blocked by the opaque regions of the mask, leaving that underlying portion of the photoresist layer unexposed. The exposed photoresist layer can then be developed, typically through chemical removal of the exposed or unexposed regions of the photoresist layer. The end result is a semiconductor wafer coated with a photoresist layer exhibiting a desired pattern, which defines geometries, features, lines and shapes of that layer. This pattern can then be used for etching underlying regions of the wafer.

There is a pervasive trend in the art of IC device design and fabrication to increase the density with which various structures are arranged and manufactured. As such, minimum line widths (often referred to as critical dimension (CD)), separations between lines, and pitch are becoming increasingly smaller. For example, nodes having a CD of about 45 nanometers (nm) to about 65 nm have been proposed. In the sub-micron processes employed to achieve devices of this scale, silicon yield is affected by factors such as reticle/mask pattern fidelity, optical proximity effects and photoresist processing. Some of the more prevalent concerns include line end pullback, corner rounding and line width variations. These concerns are largely dependent on local pattern density and topology. In addition, IC device layouts continue to increase in complexity as they decrease in scale.

Optical proximity correction (OPC) has been used to improve image fidelity. In general, current OPC techniques involve running a computer simulation that takes an initial data set, having information related to the desired pattern or layout, and manipulates the data set to arrive at a corrected data set in an attempt to compensate for the above-mentioned concerns. Briefly, the OPC process can be governed by a set of geometric rules (i.e., "rule-based OPC" employing fixed rules for geometric manipulation of the data set), a set of modeling principles (i.e., "model-based OPC" employing predetermined behavior data to drive geometric manipulation of the data set) or a hybrid combination of rule-based OPC and model-based OPC.

The computer simulation can involve iteratively refining the data set using, for example, an edge placement error value as a benchmark for the compensating process. That is, the data set can be manipulated based on the rules and/or models and the predicted placement of the edges contained in the pattern can be compared against their desired placement. For each edge, or segment thereof depending on how the edges are fragmented in the data set, a determination of how far the predicted edge/segment placement deviates from the desired location is derived. For instance, if the predicted edge placement corresponds to the desired location, the edge placement error for that edge will be zero.

In general, rule-based OPC is considered to be computationally faster than model-based OPC (especially for larger and more complex layouts). However, the OPC rule set, which is used in connection with rule-based OPC, is often inadequate for providing correction of data sets corresponding to complex layouts. Further, the OPC rule set is typically created manually, which is time-consuming and may lead to inaccuracies often associated with human error.

Accordingly, a need exists in the art for an improved OPC technique.

SUMMARY OF THE INVENTION

According to one aspect of the invention, the invention is directed to a method of automatically creating or optimizing an optical proximity correction (OPC) rule set. The method can include providing an initial OPC rule set and applying the initial OPC rule set to an initial layout data set to generate a corrected layout data set. The method can include simulating how structures represented by the corrected layout data set will pattern on a wafer and determining whether residual edge placement errors are present within structures represented by the corrected layout data set. If residual edge placement errors are present within the corrected layout data set, the method can include modifying existing OPC rules and/or adding OPC rules to correct the residual edge placement errors, thereby producing a modified OPC rule set.

According to another aspect of the invention, the invention is directed to a program embodied in a computer-readable medium to automatically create or optimize an optical proximity correction (OPC) rule set. The program can include code that provides an initial OPC rule set, code that applies the initial OPC rule set to an initial layout data set to generate a corrected layout data set and code that simulates how structures represented by the corrected layout data set will pattern on a wafer. The program can further include code that determines whether residual edge placement errors are present within the structures represented by the corrected layout data set and code that modifies and/or adds OPC rules to correct the residual edge placement errors.

According to another aspect of the invention, the invention is directed to a method of automatically creating or optimizing an optical proximity correction (OPC) rule set. The method can include providing an initial OPC rule set and applying the initial OPC rule set to a layout data set to generate a corrected layout data set. It can be determined whether residual edge placement errors are present or are within specified limits within the corrected layout data set and OPC rules can be modified and/or added to correct for residual edge placement errors within the corrected layout data set.

These and other features of the invention are fully described and particularly pointed out in the claims. The following description and annexed drawings set forth in detail certain illustrative embodiments of the invention, these embodiments being indicative of but a few of the various ways in which the principles of the invention may be employed.

BRIEF DESCRIPTION OF DRAWINGS

These and further features of the present invention will be apparent with reference to the following description and drawings, wherein.

DISCLOSURE OF INVENTION

Figure 1:
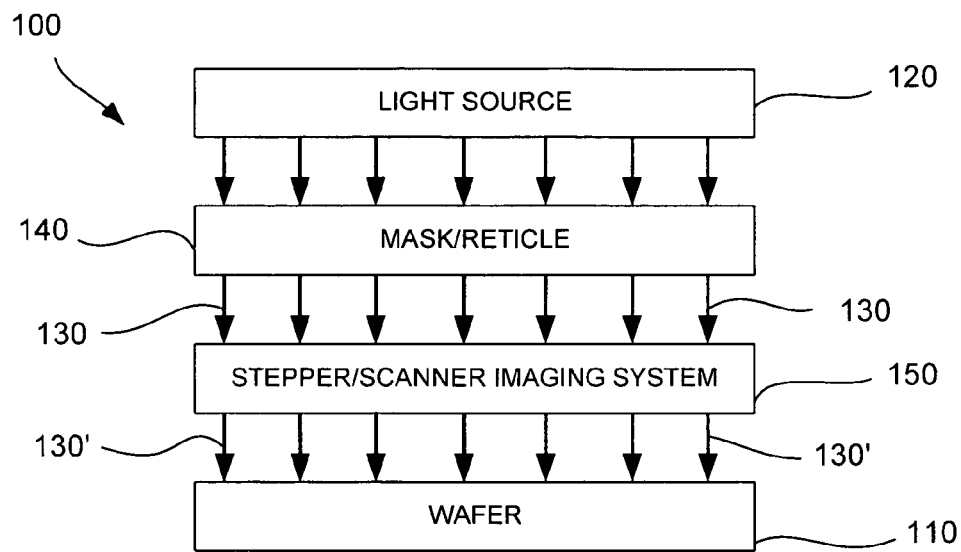
FIG. 1 is a schematic diagram of an exemplary photolithographic processing arrangement for patterning wafers with reticle data corrected in accordance with the present invention.

In the detailed description that follows, corresponding components have been given the same reference numerals regardless of whether they are shown in different embodiments of the present invention. To illustrate the present invention in a clear and concise manner, the drawings may not necessarily be to scale and certain features may be shown in somewhat schematic form.

One aspect of the present invention includes a method of automatically creating and/or optimizing an optical proximity correction (OPC) rule set. An initial OPC rule set can be provided and applied to a layout data set to generate a corrected layout data set. The corrected layout data set can be simulated and evaluated to determine whether residual edge placement errors are present within the corrected data set. The residual edge placement errors can be calculated and sorted based on the geometric properties of the structures or features in proximity to the edge for which the residual edge placement error is determined to be present. New OPC rules can be added and/or existing OPC rules can be modified based on the residual errors and the geometric properties of structures or features in proximity to edges for which the residual edge placement errors are calculated.

The present invention will be described herein in terms of automatically creating and/or optimizing optical proximity correction (OPC) rules for use in the exemplary context of the design process for ultimately patterning a semiconductor layer (e.g., polysilicon) that forms a part of an integrated circuit (IC) device. Exemplary IC devices can include general use processors made from thousands or millions of transistors, a flash memory array, SRAM (static random-access memory) cells or any other dedicated circuitry. However, one skilled in the art will appreciate that the methods and systems described herein can also be applied to the design process and/or manufacture of any article manufactured using photolithography, such as micromachines, disk drive heads, gene chips, microelectro-mechnical systems (MEMS) and the like.

With reference to FIG. 1, an exemplary photolithographic processing arrangement for manufacturing or otherwise processing integrated circuit devices designed and layed out using OPC rule sets generated in accordance with the present invention is provided. The processing arrangement can include an optical system 100 used to image a pattern onto a wafer 110. The general arrangement of the optical system 100 is relatively well-known in the art and will not be described in great detail. The optical system 100 can include a light source 120 for directing light or other actinic energy 130 of a pre-determined wavelength toward a mask or reticle 140. The light energy 130 can be produced by any suitable light source 120, such as an excimer laser, providing light at a wavelength of 248 nm, 193 nm or 157 nm, using, for example, a KrF source, an ArF source, a $F_2$ source, etc. The optical system 100 can be arranged such that the light energy 130 can be used to produce IC nodes on the wafer 110 having a critical dimension (CD) of, for example, 130 nm, 100 nm, 65 nm and so forth. It is also contemplated that wavelengths, such as 157 nm and extreme-ultraviolet wavelengths, can also be used to produce even smaller CDs, such as 45 nm.

The reticle 140 blocks light energy 130 from certain predetermined portions of the wafer 110 such that a light pattern 130' defined by the reticle layout is transferred to the wafer 110. A stepper/scanner imaging system 150 sequentially directs the light pattern 130' transmitted by the reticle 140 to a series of desired locations on the wafer 110.

Figure 2:
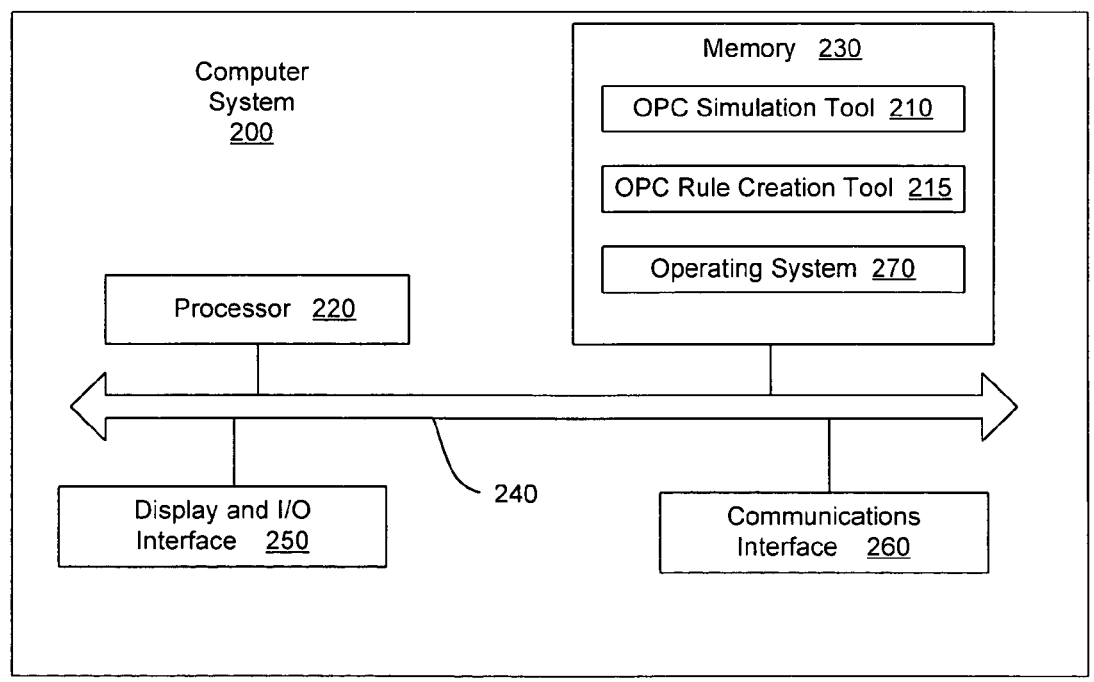
FIG. 2 is a schematic block diagram of a computer system capable of executing an optical proximity correction (OPC) simulation tool and an OPC rule creation tool in accordance with the present invention.

Turning now to FIG. 2, a schematic block diagram of a computer system 200 capable of executing an OPC simulation tool 210 and an OPC rule creation tool 215 in accordance with the present invention is illustrated. As indicated, the OPC simulation tool 210 can be used to iteratively make adjustments to a reticle layout using an OPC rule set generated and/or optimized by the rule creation tool 215 in order to account for process variations introduced by the optical system 100 and the optical distortions created by the pattern itself (e.g., optical interference, diffraction, etc.). In one embodiment, the OPC simulation tool 210 and OPC rule creation tool 215 are embodied as separate computer programs (e.g., software applications including a compilation of executable code). Alternatively, the OPC simulation tool 210 and the OPC rule creation tool 215 can be embodied as a single computer program or application.

To execute the OPC simulation tool 210 and the OPC rule creation tool 215, the computer system 200 can include one or more processors 220 used to execute instructions that carry out specified logic routines. In addition, the computer system 200 can include a memory 230 for storing data, software, logic routine instructions, computer programs, files, operating system instructions, and the like. The memory 230 can comprise several devices and includes, for example, volatile and non-volatile memory components. As used herein, the memory 230 can include, for example, random access memory (RAM), read-only memory (ROM), hard disks, floppy disks, compact disks (e.g., CD-ROM, DVD-ROM, CD-RW, etc.), tapes, and/or other memory components, plus associated drives and players for these memory types. The processor 220 and the memory 230 are coupled using a local interface 240. The local interface 240 can be, for example, a data bus, accompanying control bus, a network, or other subsystem.

The computer system 200 can include various video and input/output interfaces 250 as well as one or more communications interfaces 260. The interfaces 250 can be used to couple the computer system 200 to various peripherals and networked devices, such as a display (e.g., a CRT display or LCD display), a keyboard, a mouse, a microphone, a camera, a scanner, a printer, a speaker, and so forth. The communications interfaces 260 can be comprised of, for example, a modem and/or network interface card, and can enable the computer system 200 to send and receive data signals, voice signals, video signals, and the like via an external network, such as the Internet, a wide area network (WAN), a local area network (LAN), direct data link, or similar wired or wireless system.

The memory 230 can store an operating system 270 that is executed by the processor 220 to control the allocation and usage of resources in the computer system 200. Specifically, the operating system 270 controls the allocation and usage of the memory 230, the processing time of a processor 220 dedicated to various applications being executed by the processor 220, and the peripheral devices, as well as performing other functionality. In this manner, the operating system 270 serves as the foundation on which applications, such as the OPC simulation tool 210 and the OPC rule creation tool 215, depend, as is generally known by those of ordinary skill in the art.

Figure 3:
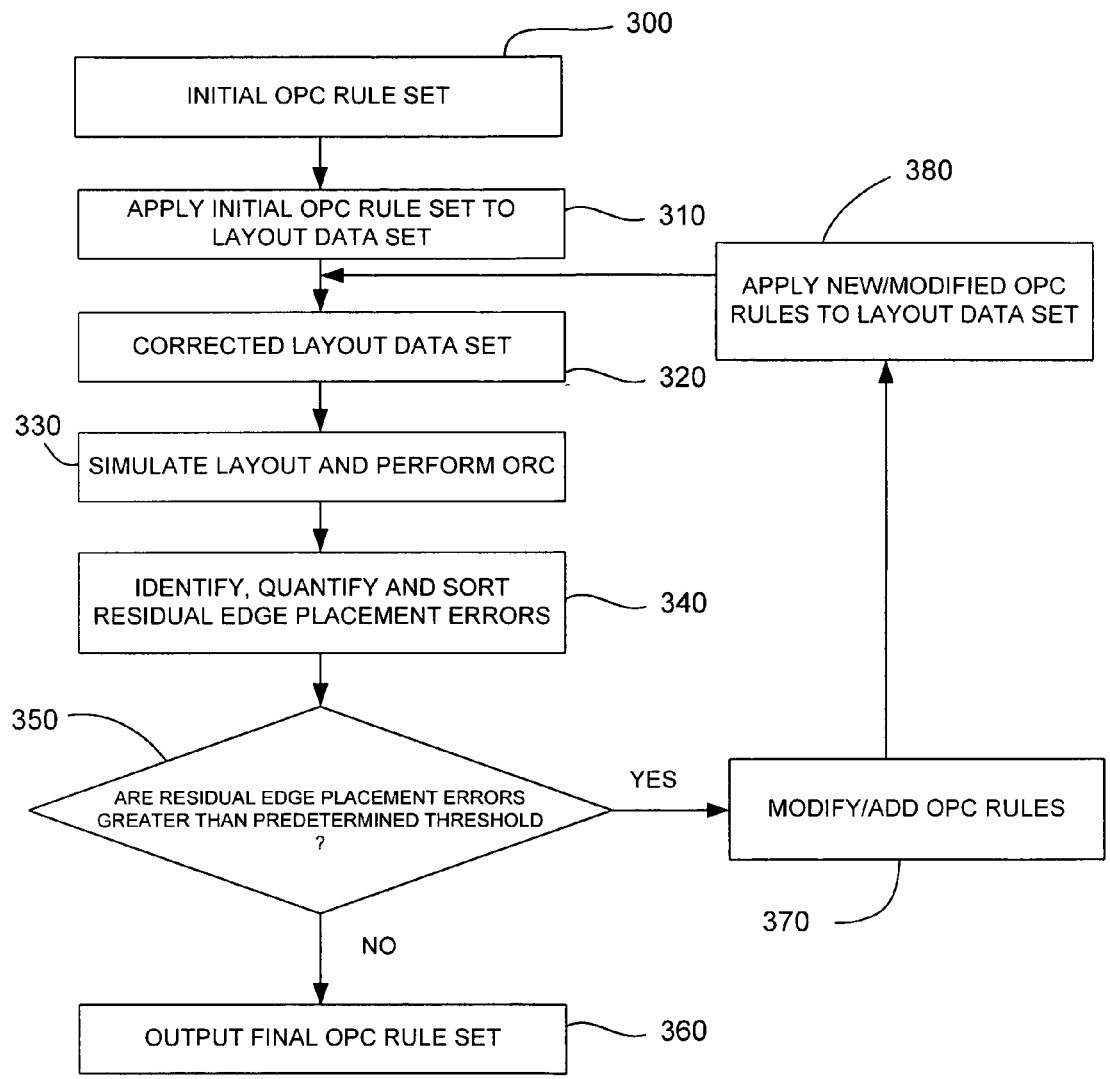
FIG. 3 is a flow chart illustrating a method of automatically creating and/or optimizing OPC rules in accordance with the present invention.

With reference now to FIG. 3, one embodiment of a method of automatically creating and/or optimizing an optimal proximity correction (OPC) rule set is provided. The flow chart of FIG. 3 can be thought of as depicting steps of a method implemented on or with the assistance of the computer system 200 of FIG. 2.

The method, as specified by the OPC simulation and OPC rule creation tools 210, 215, can begin at step 300 with an initial OPC rule set. The initial OPC rule set can include a simplified set of OPC rules (also referred to, individually, as scripts or, collectively, as an OPC rule deck), which, in one embodiment, can be created manually by a designer or operator. Artisans will appreciate that OPC rules can include fixed rules for geometrically manipulating or otherwise adjusting a reticle layout to account for process variations and/or optical distortions. Exemplary OPC rules include, but are not limited to, edge adjustments, the addition of "hammerheads" or serifs, the addition of sub-resolution assist features and the like. The OPC simulation tool 210 can execute or otherwise apply the plurality of OPC rules within an OPC rule set to a reticle layout corresponding to a desired topology.

At step 310, the initial OPC rule set can be applied to a layout data set (also referred to as a target database). Typical formats for the shapes of a layout data set or target database include GDS II and CIF. As will become clear through the following description, the OPC simulation tool 210 acts on this topographical data set using the initial OPC rule set (and, ultimately, the final OPC rule set) to assist in the design or production of a reticle layout that will be used to achieve a desired IC layer topology through the photolithographic process. In one embodiment, the initial OPC rule set can be applied to one or more layout data sets, thereby producing one or more corrected data sets (step 320).

In one embodiment, the layout data set can include geometrical representations of structures to be formed on a wafer from a layer of material, including layout information regarding the size and relative position of each structure. For example, if the layer is to be used to form polysilicon gate electrodes, the data set can include a plurality of rectangles (and other polygons and/or curvilinear shapes) with location information such that, upon ultimate formation of the gate electrodes, the gate electrodes are formed over a substrate of the wafer in locations to define corresponding channels between a source and a drain of each device.

In addition, the layout data set referred to at step 310 can include one or more test layouts corresponding to test chip patterns (including problematic patterns). In this embodiment, the layout data sets can include a plurality of parametrically varying geometric layouts or layout patterns (e.g., layout test patterns can be generated automatically or otherwise provided). In one embodiment, a plurality of parametrically varying layout test patterns can be generated in the form of GDS layout files or layout data sets from one or more design spreadsheets. These layout files can be created using polygon creation commands in programming languages, such as, TCL, AMPLE or another appropriate language. As is described more fully below, applying the initial OPC rule set to a plurality of layout data sets, including layout test pattern data sets, allows for a full exploration of the shortcomings of the initial OPC rule set and facilitates the automatic creation and/or optimization of an OPC rule set. It is to be appreciated that the parametrically varying layout test patterns can include a number of parameters to be systematically varied for each variation of the layout test patterns. Parameters to be varied can include, but are not limited to, pitch, line width, tip-to-tip distance, length, spacing between features and the like.

Once the initial OPC rule set has been applied to one or more layout data sets (step 310), one or more corrected data sets (also referred to as first-pass OPC data) can be provided at step 320. At step 330, the layout (or layouts) represented by the corrected layout data set(s) can be simulated. Simulating the layout represented by the corrected layout data set can include producing or otherwise generating a "simulation image," which corresponds to a simulation of an image that would be printed on a wafer if the wafer was exposed to an illumination source directed through a mask including the layout. The layout represented by the corrected layout data set can be simulated using one of a variety of commercially available simulation tools, such as, for example, CALIBRE® from Mentor Graphics Corp.

Simulation of the layout represented by the corrected layout data set (step 320) can include performing optical rule checking (ORC). The OPC simulation tool 210 can perform the simulation and ORC (based on one or more appropriate metrics) in order to identify problem areas within the layout (i.e., areas in which one or more layout structures or features demonstrate edge placement errors). It is to be appreciated that determining an edge placement error value can include comparing the predicted placement of each edge (or segment thereof) against the desired placement for the edge (or segment thereof) according to the desired layout. In one embodiment, the determination of how far an edge (or segment thereof) deviates from the desired location is provided in a given unit of measure (such as nanometers or fractions of nanometers). For instance, if the predicted edge placement corresponds to the desired location, the edge placement error for that edge will be zero. As the predicted edge placement varies from the desired location, a positive or negative edge placement error value in nanometers can be derived, such as +2 nanometers from the desired location or −5 nanometers from the desired location. As is understood in the art, the edge placement error values for each segment can be statistically analyzed to derive a figure of merit or score (for example, root mean squared edge placement error or percentage of edges with edge placement errors outside of specification limits) for a particular iteration of the OPC simulation.

Once the layout corresponding to the corrected layout data set has been simulated and subjected to ORC (step 330), a plurality of residual edge placement errors can be identified, quantified and sorted at step 340. As used herein, "residual edge placement errors" include edge placement errors determined (via simulation and ORC) in the corrected layout data set (i.e., edge placement errors that are present despite the application of an initial OPC rule set). As discussed above, residual edge placement errors can be identified using the ORC (as part of the simulation step) to compare the predicted placement of each edge (based on the corrected layout data set) against the desired placement of the edge (or segment thereof) according to the desired layout. In addition to identifying residual edge placement errors, the ORC software can also quantify each residual edge placement error (providing a plurality of residual edge placement error values).

In addition, for each edge that demonstrates a residual edge placement error, the geometric properties of structures or features surrounding, in proximity to or otherwise adjacent the edge that demonstrates residual edge placement error can be recorded by the ORC software. These geometric properties can include, but are not limited to, length of the feature, width of the feature, length of an adjacent feature, angles of edges, width of an adjacent feature, spacing between adjacent features, the run length of the proximity between adjacent features and the like. In addition, the residual edge placement error values can be sorted based on one or more of the aforementioned geometric properties (e.g., length, width, spacing and the like).

At step 350, the residual edge placement errors can be compared to one or more predetermined threshold values (e.g., one or more existing edge placement error specification limits). If it is determined at step 350 that there are no existing residual edge placement errors larger than the predetermined threshold, a final OPC rule set will be outputted at step 360. However, if it is determined at step 350 that one or more residual edge placement errors are greater than the one or more predetermined threshold values, the OPC rule set will be modified at step 370.

Modifying existing OPC rules and/or adding new OPC rules can include creating OPC rules based on (i.e., to correct for) the residual edge placement error values, which are sorted based on adjacent geometric properties of the edge being studied as well as geometric properties of adjacent structures (step 340). In one embodiment, the OPC rule creation tool 215 can generate one or more new and/or modified OPC rules in order to correct or otherwise compensate for the residual edge placement errors for a given combination of geometric properties (e.g., given lengths, widths and spacings of features). For example, a new OPC rule can be created, which specifies that a given edge correction (or edge movement) should be provided in a layout having a first feature having a width within a given range and a length within another given range in proximity to a second feature having a width within a given range and a spacing therebetween of a given range. New OPC rules generated in a manner described above can be appended to the initial rule set or rule deck or can replace the initial rule set entirely.

Once a new and/or modified OPC rule set is generated at step 370, the new and/or modified OPC rule set can be applied to the layout data set (step 380) in the manner described more fully above with reference to step 310. Once the new and/or modified OPC rules are applied to the layout data set (380) the simulation and accompanying ORC (step 330) as well as the other steps described more fully above can be repeated in an iterative fashion in order to provide a final OPC rule set (step 360) that eliminates all (or at least most) edge placement errors outside of a predetermined specification limit. In other words, at each iteration, after the OPC rules are modified, a new rule set or rule deck (i.e., a complete rule set or rule deck, with modifications applied to the previous iteration of the rule set or rule deck) can be applied afresh to the original (uncorrected) layout data as a test of its sufficiency for edge placement error correction.

It is to be appreciated that a plurality of layout data sets (including real layout patterns and/or test layout patterns) can be used in order to automatically create an OPC rule set or rule deck that is able to apply accurate OPC corrections to complicated layouts. The methodology described above can be used to automatically create OPC rule sets that are far more complicated then could easily be determined manually. In addition, each new OPC rule set can be used going forward for evaluations of increasingly complex layouts.

With further reference to FIGS. 4A-4D, schematic diagrams of a simplified layout are provided to illustrate the methodology for automatically creating and/or optimizing an OPC rule set (which is described more fully above with reference to FIG. 3). FIGS. 4A-4D show a first feature or structure 405 in proximity to a second feature or structure 415. While FIGS. 4A-4D show an extremely simplified portion of an exemplary layout including only a handful of edges in order to assist in the discussion herein, it is to be appreciated that actual topologies of IC layers often have hundreds of edges (e.g., about 500 edges) within a given 2 micron window.

Figure 4A:
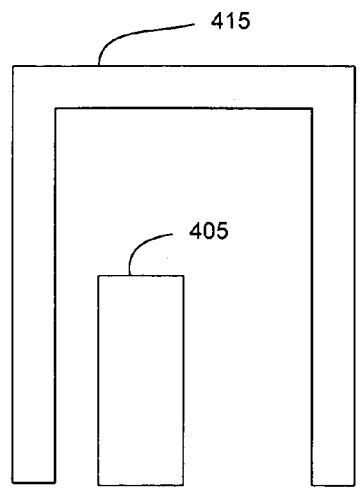
FIGS. 4A-4D are schematic diagrams of a simplified layout illustrating a methodology for creating OPC rules in accordance with the present invention.

FIG. 4A shows a schematic representation of a small portion of a desired layout, including a first feature or structure 405 in proximity to a second feature or structure 415.

Figure 4B:
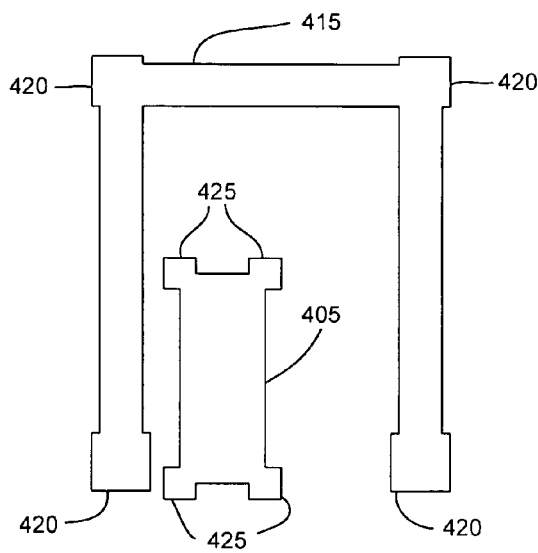

FIG. 4B shows the portion of the layout shown in FIG. 4A after an initial OPC rule set is applied to the layout. In this illustrated embodiment, several OPC adjustments have been made to the original layout shown in FIG. 4A. These OPC adjustments include adding serifs 420 to the first feature 405, adding serifs 425 to the second feature 415 and adjusting the spacing between the first and second features 405, 415 (thereby resulting in a corrected layout data set).

Figure 4C:
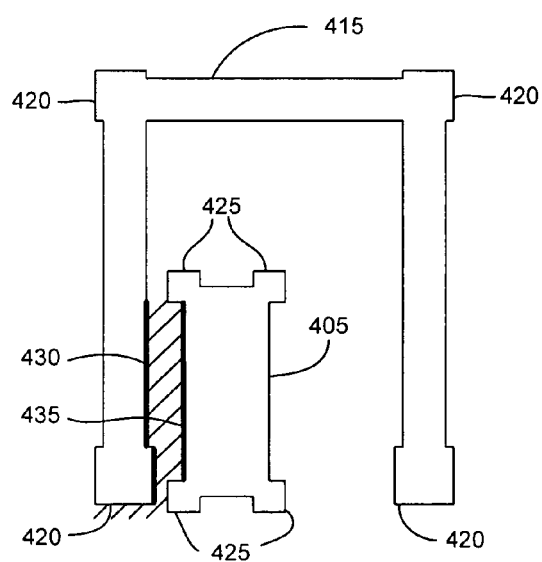
Figure 4D:
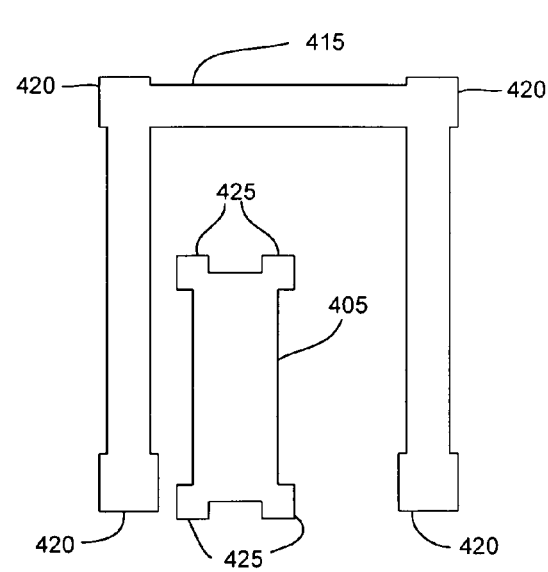

FIG. 4C schematically shows the layout corresponding to the corrected layout data set after simulation and ORC (as described above with reference to step 330). FIG. 4C schematically illustrates the flagging or otherwise identifying of edges 430 and 435 in which residual edge placement errors have been detected and calculated by the simulation and ORC software. In addition, a cross-hatched region is illustrated demonstrating unacceptable spacing between features 405 and 415.

As described more fully above with reference to FIG. 3, these residual edge placement errors can be calculated and sorted (step 340) based on geometric properties of features 405 and 415 in order to add rules to or otherwise modify the OPC rule set. Once the OPC rule set has rules added thereto and/or is modified, it can be applied once again to the original layout data set (FIG. 4B) to make new and improved OPC adjustments (illustrated in FIG. 4D). Once simulation and accompanying ORC are performed on the layout illustrated in FIG. 4D and no residual edge placement errors are detected, the method ends with the output of a final OPC rule set, as described above.

Although the illustrations appended hereto show a specific order of executing functional logic blocks, the order of execution of the blocks can be changed relative to the order shown. Also, two or more blocks shown in succession may be executed concurrently or with partial concurrence. Certain blocks may also be omitted. In addition, any number of commands, state variables, warning semaphores, or messages can be added to the logical flow for purposes of enhanced utility, accounting, performance, measurement, or for providing troubleshooting aids, and the like. It is understood that all such variations are within the scope of the present invention.

Although particular embodiments of the invention have been described in detail, it is understood that the invention is not limited correspondingly in scope, but includes all changes, modifications and equivalents.

What is claimed is:

1. A method of automatically optimizing an optical proximity correction (OPC) rule set, said method comprising:
   (a) providing an initial OPC rule set;
   (b) applying the initial OPC rule set to an initial layout data set to generate a corrected layout data set;
   (c) simulating how structures represented by the corrected layout data set will pattern on a wafer;
   (d) determining whether residual edge placement errors are present within structures represented by the corrected layout data set;
   (e) for each residual edge placement error, recording a plurality of geometric properties of (i) the structure for which the edge placement error is determined and (ii) at least one structure adjacent the structure for which the edge placement error is calculated;
   (f) sorting the residual edge placement errors based on the recorded geometric properties; and
   (g) if residual edge placement errors are present within the corrected layout data set, creating a modified OPC rule set to correct the residual edge placement errors.

2. The method of claim 1, said method further comprising:
   (h) applying the modified OPC rule set to the initial layout data set; and
   (i) repeating steps (c)-(h) until no residual edge placement errors are found.

3. The method of claim 2, said method further comprising:
   (j) outputting a final OPC rule set once no residual edge placement errors are found.

4. The method of claim 1, wherein step (c) includes performing optical rule checking (ORC) on the structures represented by the corrected layout data set.

5. The method of claim 4, wherein step (c) includes calculating edge placement errors for edges of structures represented by the corrected layout data set.

6. The method of claim 5, wherein step (d) includes comparing each calculated edge placement error to a predetermined edge placement error threshold.

7. A method of automatically optimizing an optical proximity correction (OPC) rule set, said method comprising:
   (a) providing an initial OPC rule set;
   (b) applying the initial OPC rule set to an initial layout data set to generate a corrected layout data set;
   (c) simulating how structures represented by the corrected layout data set will pattern on a wafer;
   (d) determining whether residual edge placement errors are present within structures represented by the corrected layout data set;
   (e) for each residual edge placement error recording a plurality of geometric properties of (i) the structure for which the edge placement error is determined and (ii) at least one structure adjacent the structure for which the edge placement error is calculated;
   (f) sorting the residual edge placement errors based on the recorded geometric properties; and
   (g) if residual edge placement errors are present within the corrected layout data set, creating a modified OPC rule set to correct the residual edge placement errors;
   wherein the geometric properties include (i) width and length of the feature for which the edge placement error is calculated, (ii) width and length of at least one feature adjacent the feature for which the edge placement error is calculated and (iii) spacing between the feature for which the edge placement error is calculated and at least one feature adjacent the feature for which the edge placement error is calculated.

8. The method of claim 1, wherein creating the modified OPC rule set includes specifying an edge adjustment edge based on the recorded geometric properties and residual edge placement errors.

9. The method of claim 1, wherein step (b) includes applying the initial OPC rule set to a plurality of layout data sets.

10. The method of claim 9, wherein the plurality of layout data sets include layout data sets corresponding to real IC device patterns and test patterns.

11. A program embodied in a computer-readable medium to automatically create or optimize an optical proximity correction (OPC) rule set, said program comprising:
    code that provides an initial OPC rule set;
    code that applies the initial OPC rule set to an initial layout data set to generate a corrected layout data set;
    code that simulates how structures represented by the corrected layout data set will pattern on a wafer;
    code that determines whether residual edge placement errors are present within the structures represented by the corrected layout data set;
    code that sorts residual edge placement errors based on one or more recorded geometric properties; and
    code that creates a modified OPC rule set to correct the residual edge placement errors.

12. The program of claim 11, said program further comprising:
    code that applies the modified OPC rule set to the initial layout data set; and
    code that repeats the simulating, determining, modifying and applying the modified OPC rule set until (i) no residual edge placement errors are found or (ii) the residual edge placement errors are within specified limits.

13. The program of claim 12, said program further comprising: code that outputs a final OPC rule set once (i) no residual edge placement errors are found or (ii) the residual edge placement errors are within specified limits.

14. A method of automatically creating or optimizing an optical proximity correction (OPC) rule set, said method comprising:
    providing an initial OPC rule set;
    applying the initial OPC rule set to an initial layout data set to generate a corrected layout data set;
    determining whether residual edge placement errors (i) are present or (ii) are within specified limits within the corrected layout data set;
    sorting the residual edge placement errors based on one or more recorded geometric properties; and
    creating a modified OPC rule set to correct for residual edge placement errors within the corrected layout data set.

15. The method of claim 14, wherein the determining step includes:
    simulating how structures represented by the corrected layout data set will pattern on a wafer; and
    performing optical rule checking (ORC) on the structures represented by the corrected layout data set.

16. The method of claim 14, said method further comprising:
    applying the modified OPC rule set to the initial layout data set; and
    repeating the steps of determining, modifying and applying the modified OPC rule set steps until no residual edge placement errors are found.

* * * * *